US006331812B1

(12) United States Patent
Dawalibi

(10) Patent No.: US 6,331,812 B1
(45) **Date of Patent: *Dec. 18, 2001**

(54) PROGRAMMABLE ELECTRONIC LOCKING DEVICE

(75) Inventor: Nofal Dawalibi, Riyad (SA)

(73) Assignee: Electronic Key Systems (E.K.S.) S.A.R.L., Luxembourg (LU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,217

(22) PCT Filed: Jan. 3, 1996

(86) PCT No.: PCT/FR96/00003

§ 371 Date: Jul. 21, 1997

§ 102(e) Date: Jul. 21, 1997

(87) PCT Pub. No.: WO96/23122

PCT Pub. Date: Aug. 1, 1996

(30) Foreign Application Priority Data

Jan. 25, 1995 (FR) .................................................. 95 00822

(51) Int. Cl.[7] ........................................................ G06F 7/00

(52) U.S. Cl. ............................ 340/5.2; 340/5.8; 340/5.1; 340/825.56; 70/336; 70/393

(58) Field of Search ......................... 340/825.31, 825.34, 340/825.3, 825.56, 5.2, 5.8, 5.1; 70/336, 391, 393, 408, 413, 409, 263; 361/172, 139, 160, 170, 171; 1/1

(56) References Cited

U.S. PATENT DOCUMENTS 4,200,227 * 4/1980 Lemelson ........................... 70/336 X
4,558,175 * 12/1985 Genest et al. ................... 340/825.34
4,602,253 * 7/1986 Kreft .............................. 340/825.31
4,835,407 * 5/1989 Kataoka et al. ............ 340/825.31 X
4,931,789 * 6/1990 Pinnow ........................... 340/825.56
5,019,812 * 5/1991 Gostahagberg et al. ........ 340/825.31
5,140,317 * 8/1992 Hyatt, Jr. et al. ............... 340/825.31
5,540,069 * 7/1996 Muller et al. ............... 340/825.31 X
5,552,777 * 9/1996 Gokcebay et al. .............. 340/825.31
5,605,066 * 2/1997 Hurskainen ........................ 70/408 X
5,625,349 * 4/1997 Disbrow et al. ................ 340/825.31
5,745,044 * 4/1998 Hyatt, Jr. et al. ............... 340/825.31
5,798,711 * 8/1998 Issa et al. ........................ 340/825.31

FOREIGN PATENT DOCUMENTS

401647A1 12/1990 (EP) .
2146802 3/1973 (FR) .
2597913 10/1987 (FR) .
2599415 12/1987 (FR) .
2599776 12/1987 (FR) .
2610033 7/1988 (FR) .
2614642 11/1988 (FR) .
2655368 6/1991 (FR) .
2 261 254 A 5/1993 (GB) .
62-206179 8/1987 (JP) .
3-100285 4/1991 (JP) .
4-302682 10/1992 (JP) .
4-306378 10/1992 (JP) .
5-195658 8/1993 (JP) .
6-66056 3/1994 (JP) .
6-62155 9/1994 (JP) .

* cited by examiner

*Primary Examiner*—Michael Horabik
*Assistant Examiner*—Yves DaLencourt

(57) ABSTRACT

A programmable electronic closure system has a lock for operation by a key when an identification code of the key and a corresponding code of the lock match. The closure system can be programmed to modify the code data in both the key and the lock using an input device.

32 Claims, 5 Drawing Sheets

PROGRAMMABLE ELECTRONIC LOCKING DEVICE

FIELD OF THE INVENTION

The present invention relates to the field of electronic or mechanical-and-electronic locks, and to associated security combination keys.

PRIOR ART

At present, in dwellings, and more generally in local or professional premises there exist numerous types of mechanical lock designed to be received in the moving part of a door or of a gate and in which the cylinder complies, dimensionally, with European or international standards that are in force. Such cylinders are particularly complex to implement and they often make it possible to obtain several billion different combinations, with the best of them presenting excellent resistance to picking and to drilling.

There also exist on the market very many locking devices based on a system comprising a lock and a key, e.g. for cars (steering-column locks) or more generally in industry, in particular for authorizing or preventing operation of numerous appliances or indeed of electronic cabinets or racks.

Over the last few years, there have also been developments in locks that combine mechanical coding implemented by bitting or notches coexisting with an electronic combination that exists in the key or the lock. European patent application No. 0 277 432 shows an example of one such mechanical-and-electronic lock in which the key comprises not only conventional mechanical coding for releasing the lock, but also an electronic circuit that, when the key is inserted in the lock, transmits a preprogrammed identification code to the lock, which code is in turn transmitted to an external control module which decodes it, said module also serving to power the lock-and-key combination. In a more elaborate version, that electronic system may comprise a non-volatile memory including an identification code for the lock with which it is associated. Application FR 2 561 292 shows an electronic key capable of being used with a mechanical-and-electronic lock and including both notches for mechanical coding and an electronic micro-processor circuit powered by a battery disposed directly in a portion of the key.

Nevertheless, each of the above-specified locks suffers from a major drawback in that their security depends essentially on the type of mechanical cylinder used for receiving the keys, with the electronic device providing no more than an additional security element. Maximum security is provided above all by the cylinder being of complex structure, with the consequence of the lock being very expensive. In addition, any loss of the key automatically requires the cylinder to be replaced (it being out of the question to modify this mechanical element), whether or not the cylinder is associated with electronic means. Naturally, in order to guarantee such high security, each cylinder is associated with one key, and with one key only.

Also, the proprietor of application EP 0 388 997 has proposed a lock that is entirely electronic in which a door is opened in the event that an identification code of the key corresponds to a code of the lock. The key includes a memory capable of receiving a plurality of codes corresponding to different locks, and the cylinder of each lock includes a power supply for its own electronic circuits and for those of the key. In addition, the cylinder described may have standardized dimensions analogous to those of a cylinder of a conventional lock.

Nevertheless, that electronic locking system still suffers from certain drawbacks, in particular in the event of the key being lost or in the event of the power supply running low, thereby greatly restricting practical application thereof and, in fact, making it unsuitable for any commercial use. For example, in the event of the key being lost, the user must necessarily turn to the manufacturer who must then make a visit in order to reprogram the codes in each of the locks. Possibly, if the manufacturer authorizes it and if the manufacturer desires to be the only source of reprogramming, the user must turn to a centralized computer device. However, under such circumstances, the complexity of the resulting system makes it particularly expensive and difficult to use for a non-professional user.

OBJECT AND DEFINITION OF THE INVENTION

An object of the present invention is to mitigate the above-specified drawbacks by providing a programmable electronic closure device that is particularly simple and cheap and capable of being implemented by any user, even if not professional.

An essential aim of the invention is to make it possible by individual programming of each key to provide the user thereof with access to all of the security characteristics of the lock.

Another aim of the invention is to provide an electronic device capable of replacing existing mechanical devices, particularly in order to increase security, without requiring excessive expenditure, i.e. without requiring complex intervention on the devices or the structures in which they are incorporated. Yet another aim of the invention is to propose a device whose characteristics may advantageously be compared with those of present devices but that also present additional functions.

These aims are achieved by a programmable electronic closure system comprising a lock designed to be operated by a key when an identification code of the lock and an identification code of the associated key are observed to match, the system being characterized in that:

- the lock includes a cylinder provided with a portion in which at least one keyway is provided for receiving said key;
- the cylinder includes at least one electrical connection means, electronic control means including at least one memory means for storing at least one identification code and connected to the at least one electrical connection means, and release means responsive to said electronic control means and designed to release the lock; and in that
- the key includes first electrical connection means for co-operating with the electrical connection means of the lock when the key is inserted in the corresponding keyway, first electronic control means including at least first memory means for storing at least one identification code and connected to the first electrical connection means, and programming means for modifying the data contained in each of the electronic control means of the key and of the lock under the control of means for inputting a confidential code;
- the electronic control means of the key and of the lock, and the cylinder release means being powered by power supply means.

The presence of means for programming the electronic circuits of the lock and of the key directly from the key avoids any need for the user to turn to external programming (e.g. via the manufacturer) and avoids any need to make a connection with computer means that are cumbersome and necessarily expensive.

In addition, and this constitutes an essential improvement of the invention, the above-defined technical means in combination make it possible to implement a device that is genuinely suitable for being commercialized, such that it is intended for replacing the existing mechanical devices presently on the market. Above all, the device of the invention is simple to use since it is presented like present-day systems and therefore does not require any change in the habits of the user. Further, compared with such prior art systems it has the advantage of requiring only one key for opening a plurality of locks, instead of a bunch of keys as is required at present, with the single key being capable of containing the identification code of a plurality of locks. Also, the presence of different electronic circuits and of individual programming means for said circuits makes it possible not only to reinforce the security provided by the device of the invention very simply and in significant manner, but also to provide access to numerous functions that are not presently available using mechanical keys or even electronic keys. Finally, the fact that the electronic circuits of the lock are all localized within its cylinder make it possible for anyone to replace instantly mechanical closure systems presently in use with those proposed by the invention and without requiring any connection to or use of additional external elements.

In a particular embodiment of the invention, the first and second electrical connection means are replaced by first and second cordless link means, e.g. radio or optical link means, disposed respectively in the key and in the cylinder. The structure is thus simplified and any potential problems of electrical contact that could result from multiple openings are avoided.

Preferably, the power supply means comprises a rechargeable battery or a discardable battery disposed in the key, thereby avoiding frequent and numerous disassembly as would occur if the battery were disposed in the cylinder. In addition, in order to restrict battery consumption, energy generating means disposed in the cylinder of the lock and actuated by inserting (or withdrawing) or rotating the key are provided to enable at least the release means to be powered, which means constitute the greatest consumer of energy in the cylinder.

In a preferred embodiment, the key is made up of first and second distinct portions interconnected by an intermediate portion that may be constituted either by a flexible electrical link or else by a cordless link.

In a first variant embodiment, the first portion is in the form of a rod provided with a handling head and including the first electrical connection means, and the second portion is capable of acting as an electronic multifunction unit and further includes the electronic means and the power supply of the key and the programming means.

In a more advantageous second embodiment, the key is constituted by the separable assembly of a first portion in the form of a rod provided with a handling head and including the first electrical connection means and at least the power supply means and the first memory means, and a second portion capable of acting as a multifunction electronic unit and including all of the means required for programming the data contained in the electronic means of the key and of the lock, together with third electrical connection means for receiving the first electrical connection means.

This multifunction electronic unit may be constituted by numerous presently-available devices, and in particular by a calculator, a notebook, a watch, a radio paging receiver, a telephone dialer, an alarm, or merely a sensor of physical parameters.

The key may also include additional connection means for remotely programming data contained in the electronic control means of said key and of the lock. Nevertheless, the additional connection means is preferably constituted by the first electrical connection means. Optionally, it may include cordless link means, e.g. radio or optical means.

Naturally, the various elements present on the key and enabling direct programing of the lock can be adapted without difficulty to a mechanical-and-electronic lock that also includes mechanical coding means (bitting or any other equivalent notches) designed to co-operate with corresponding decoding means existing in the cylinder of the associated lock. Under such circumstances, in order to preserve the advantages provided by the invention, it is preferable to select mechanical coding means for all of the locks operable by a given key that are identical or that constitute a hierarchy. Thus, in the event of the key being lost, there is no need to change all of the locks, but only to remake the mechanical code means of the new key so as to reproduce the mechanical code means of the old key whose characteristics are known to the user (coded profile provided by the manufacturer).

Each electronic control means of the key or of the lock or of both further includes comparison means for comparing the identification code of the lock and at least a corresponding code of the key as received via the electrical connection means.

In order to increase the security of the device of the invention, the transmission of identification codes between the lock and the key is provided by means of cipher key encoding (specific algorithm). Similarly and preferably, the memory means of the cylinder includes a memory space that is accessible by the key in read-only mode. Thus, by storing a reference number of the lock in said space and enabling it to be read by the key, it is possible subsequently to restrict comparison solely to the identification code of the lock, to the exclusion of any other code.

In a particular method of coding, each identification code includes first and second identification codes and in a normal mode, comparison between the respective identification codes of the lock and of the key is performed solely on their first identification codes, whereas in a security mode, comparison is performed on both their first and their second identification codes.

In a particular embodiment, each identification code is formed as two n-bit words, and the electronic control means of the cylinder of the lock initially operates via the comparator means disposed in the cylinder to compare the first n-bit word of the identification code of the lock with the first n-bit word of the identification code of the key as received from the key via the electrical connection means, and first electronic control means of the key likewise includes comparator means for operating, in a second stage, and in the event of a match between said two first words, to compare the second n-bit word of the identification code of the key with the second n-bit word of the identification code of the lock as received from the lock via the electrical connection means, a new match relating to the two second words being required to authorize release of the lock.

The present invention also relates to any lock, any cylinder, or any key capable of being implemented in the above-described programmable electronic system.

Advantageously, the key may also include audible or visible indicator means for informing the user whether the key is operating in normal mode or in secure mode or indeed that programming has taken place properly.

The programming means include a special (SECURE) function key making it possible only for the users of keys capable of operating in secure mode to change the identification codes of locks.

Preferably, the programming means include a special (RESTRICTION) function key enabling the holder of a key to validate access to one or more determined locks from a set of locks operable by the key, thereby making it very simple to prevent certain people to whom the key has been given having access to non-authorized places.

Similarly, the programming means include a determined combination of specific function keys (RESTRICTION and ZERO) enabling the holder of a key to prevent use thereof by activating its essential functions of reading and of comparison. Thus, when not in use, or when using a reserve key, no risk of loss or theft is to be feared since such a key cannot continue to be used without knowledge of the confidential code making it possible to deactivate the said determined combination of keys.

It should nevertheless be observed that this prohibition may be temporary only, or it may be activated automatically after a determined period of operation.

BRIEF DESCRIPTION OF THE DRAWINGS

Other characteristics and advantages of the present invention appear more clearly from the following description given by way of non-limiting indication and with reference to the accompanying drawings, in which.

DETAILED DESCRIPTION OF AN EMBODIMENT OF THE INVENTION

Figure 1:
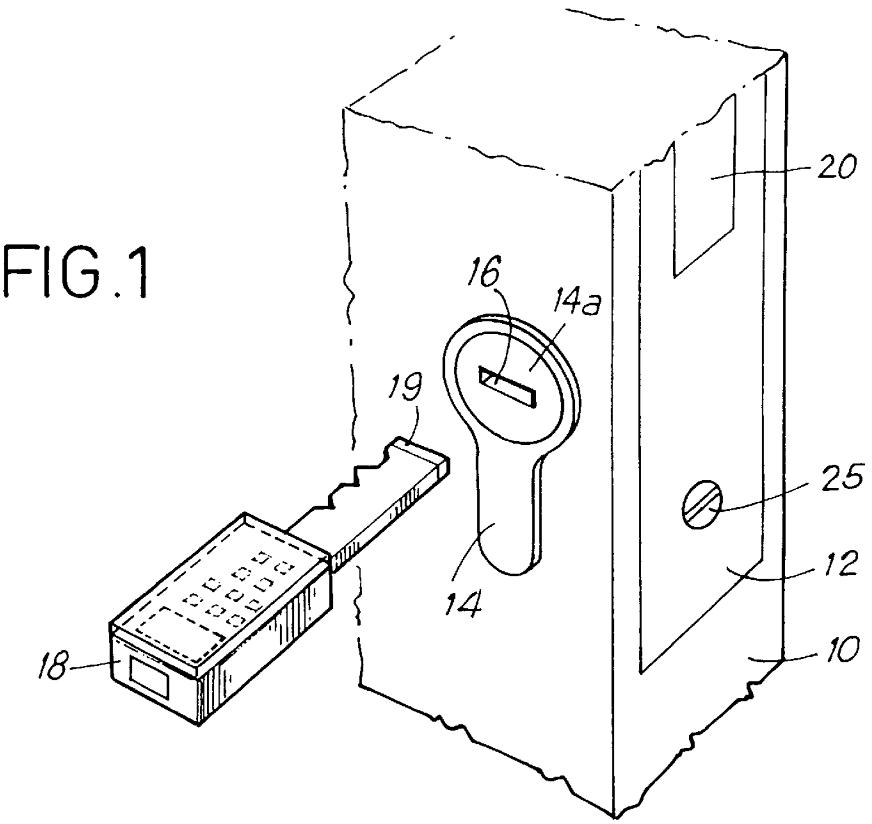
FIG. 1 is a fragmentary perspective view of a front door fitted with a lock of the invention and of the associated key.

Reference is made initially to FIG. 1 which is a perspective view of a fragment of a hinged member, e.g. a door 10, in which a high security lock 12 of the present invention is received. The lock is provided with a cylinder 14 that comprises a cylindrical member 14A which forms a rotor and in which there is formed a slot-shaped opening 16 into which a key 18 can be inserted (and more precisely the rod or blade of the key).

Figure 6:
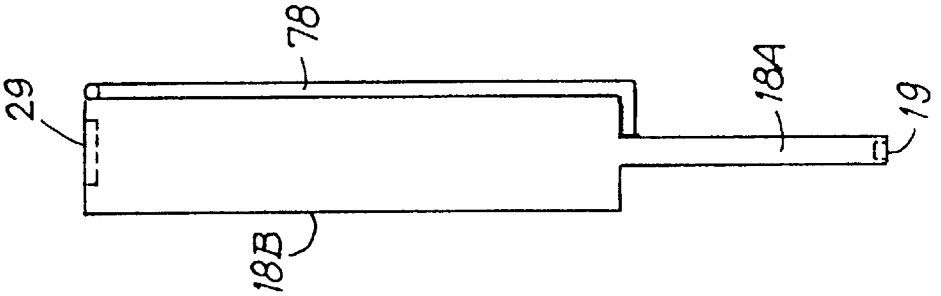
FIGS. 5 and 6 are an outside view (cover removed) and a side view of a first embodiment of the key of FIG. 1.
Figure 5:
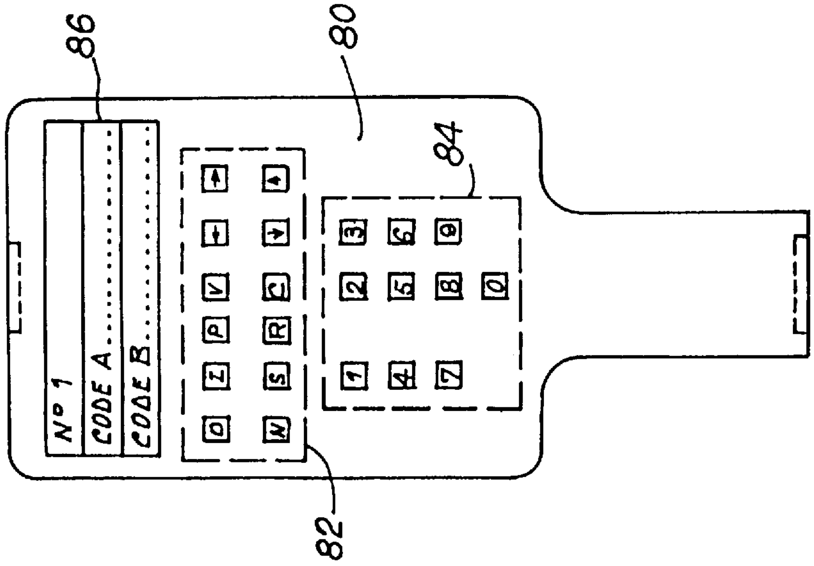

In the example shown, the key 18 which is described in greater detail below with reference to FIGS. 5 and 6 comprises, at one end, a "blade" first portion 18A in the form of a flat rod of dimensions that match the opening 16 in the cylindrical rotor 14A of the lock, and which may have a notched profile (other types of coding exist, e.g. based on fins or on indentations), and provided with first electrical connection means 19 including a set of individual contacts for authorizing actuation of the bolt 20 of the lock 12, and at its opposite end a "head" second portion 18B that may be in the form of a ring, for being rotated to drive the bolt, thereby releasing the hinged portion of the door 10.

Figure 2:
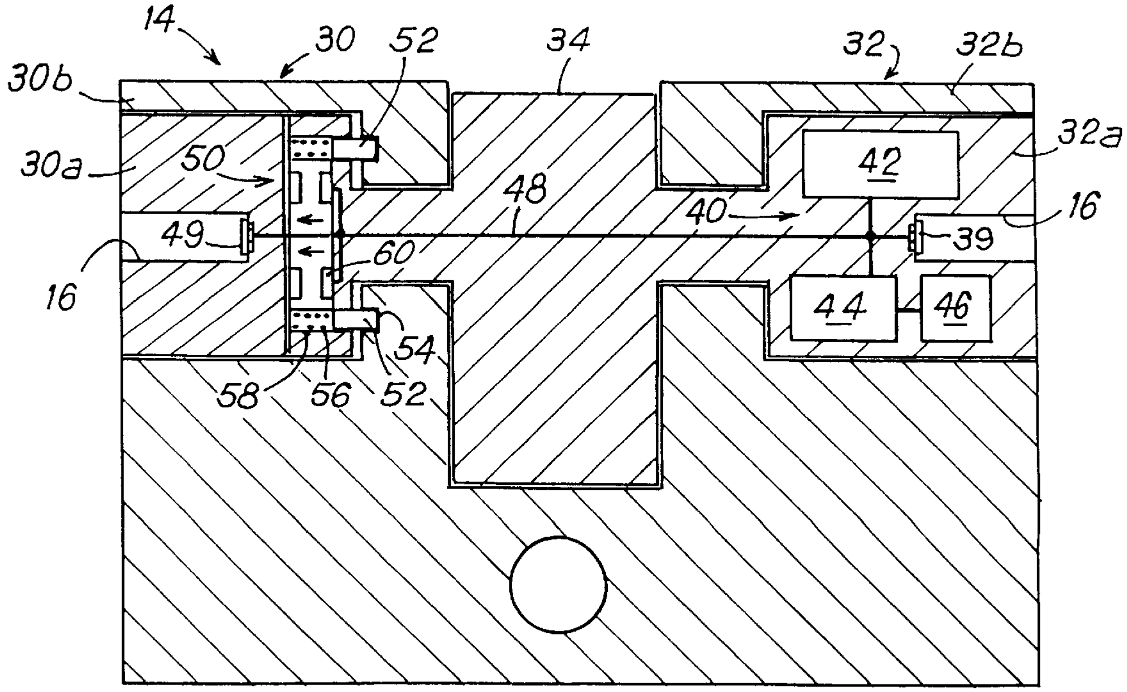
FIG. 2 is a diagrammatic longitudinal section through an embodiment of a standardized cylinder for the lock of FIG. 1.

FIG. 2 is a highly diagrammatic longitudinal section through a two-keyway (dual-cylinder) symmetrical European-profile cylinder 14 whose outside shape and dimensions are analogous to those of conventional mechanical dual-cylinder locks used for locking the front doors of apartments, thereby facilitating replacement thereof (after removing the end screw 25 in FIG. 1 and extracting the mechanical cylinder). The dual-cylinder conventionally includes an upstream portion 30, a downstream portion 32, and an intermediate rotary portion 34 for driving the bolt (directly or via conventional mechanical means). Each upstream and downstream portion comprises a rotor element 30*a* (or 32*a*) and a stator element 30*b* (or 32*b*) surrounding the corresponding rotor element and in which the keyway 16 is formed, and which is secured to the rotary intermediate portion 34 (by known means that are not shown).

Figure 3:
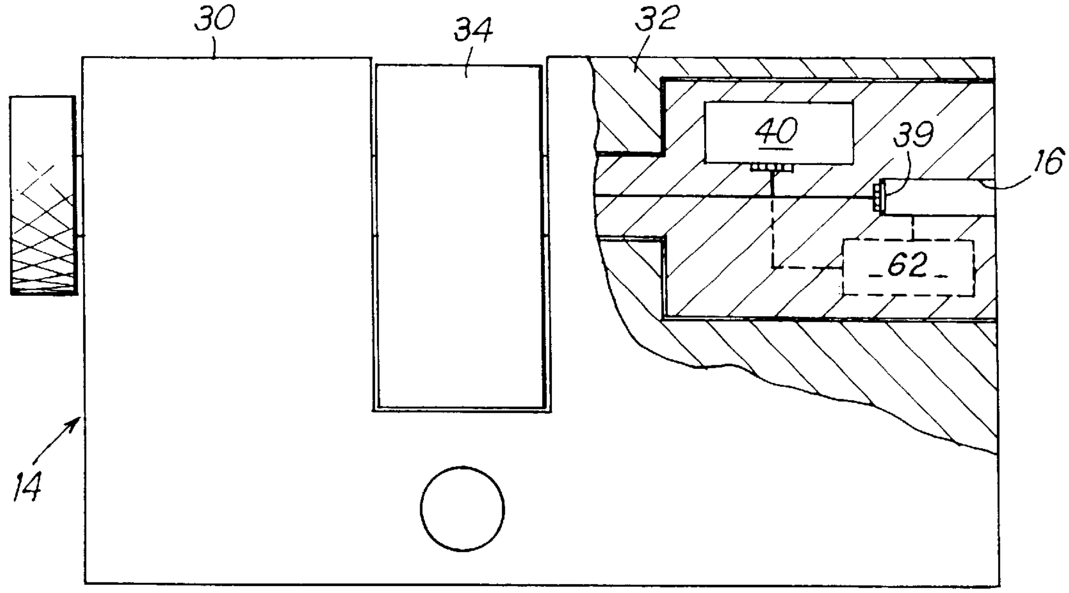
FIGS. 3 and 4 are two other embodiments of cylinders of the present invention.

According to the invention, the rotary element 32*a* of the downstream portion of the cylinder of the lock 10 includes firstly second electrical connection means 39 for co-operating with the first electrical connection means 19 of the key and provided with corresponding individual contacts,.and secondly electronic means formed by an electronic circuit 40, advantageously including a microprocessor, that has a central unit 42 or an analogous module, a program memory 44, and a data memory 46 all interconnected by a common bus 48. In addition to third electrical connection means 49 accessible via the opposite face of the cylinder, the upstream rotor portion 30*a* includes locking/release means 50 actuateable under the control of the central unit 42 and enabling the rotor elements 30*a* and 32*a* to be released mechanically relative to the stator elements 30*b* and 32*b* of the cylinder 14. These release means 50 advantageously include, for example, one or more pins or pegs 52 movably mounted in one or more corresponding first housings 54 and, in a rest position (locked cylinder position) projecting therefrom under drive from resilient elements 56 placed in said first housings, thereby causing them to be received in facing second housings 58 of the upstream stator portion 30*b*. An electromagnet 60, or any other similar device (known and used conventionally in micro-mechanics, e.g. a micromotor), is provided to operate under the control of the central unit 42 to retract the pegs 52 into their housings 54, thereby allowing the rotor elements to rotate freely and thus allowing the bolt 20 to be driven. In the example of FIG. 2, the pegs are disposed regularly around the longitudinal axis of the cylinder and parallel to said axis, and the electromagnet 60 acts simultaneously on all of the pegs so as to cause them to move together (by way of example, one simple means for achieving such movement is to design the pegs as plunging cores of the electromagnet). Optionally, as described below and as shown in FIG. 3, the cylinder may also include energy generating means 62 actuated by insertion or rotation of the key and delivering the energy required for actuating the micro-actuator 60 (electromagnet, micromotor, or analogous device) regardless of any additional energy that may be provided by a rechargeable battery or a discardable battery, for example. Although this solution appears, a priori, to be more simple, it nevertheless suffers from the problem of ensuring regular replacement of the cylinder's battery.

Naturally, the disposition of the internal components of the cylinder as shown in FIG. 2 is not limiting in any way. It is quite possible to invert the locations of the upstream and downstream components, and it is possible to place the electronic circuit and the release means all in the same upstream or downstream portion (see the embodiment of FIG. 4, for example). The locking/release means 50 which include a micro-actuator such as the electromagnet or the micromotor described above could equally well include a piezo-electrical actuator constituted by a screw subjected simultaneously to the action of piezo-electrical thrust torques situated to face each other and under the control of the central unit. Similarly, it is clear that the various components could perfectly well be implemented in cylinders other than those described above, and in particular they could be incorporated in a cylinder of a device for locking the steering column of a motor vehicle without any difficulty.

Figure 4:
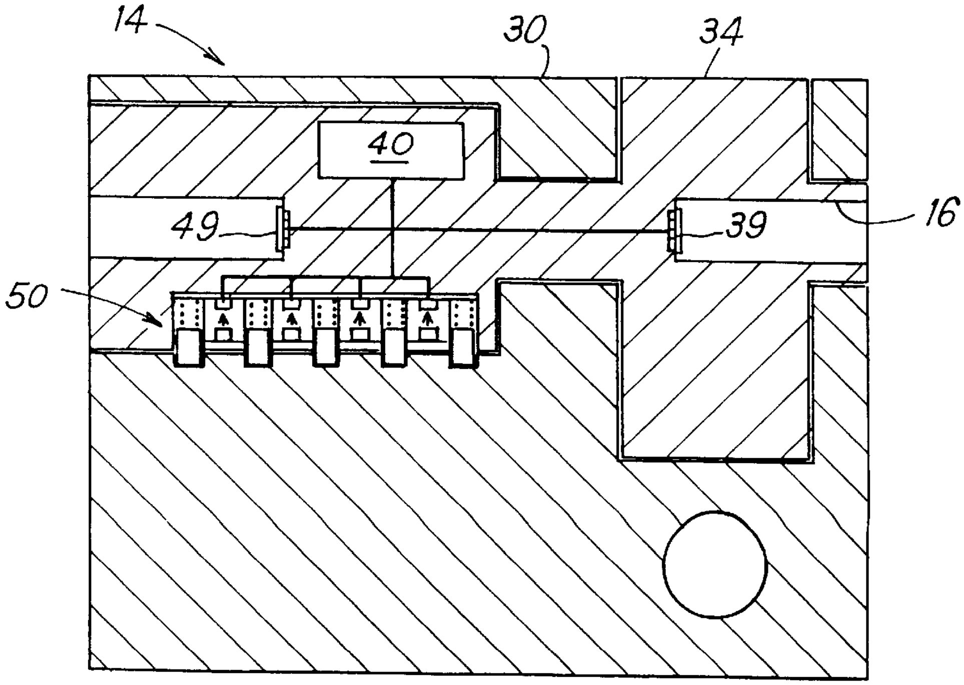

FIGS. 3 and 4 are highly diagrammatic and show variant embodiments of the cylinder 14 of the lock, likewise adapted to the doors of dwellings. In FIG. 3, the European-profile cylinder is of the single cylinder type having a knob and the pegs 52 are disposed on axes perpendicular to the longitudinal axis of the cylinder (it is naturally also possible for them to be disposed along axes in multiple directions). Of course, the number of pegs is immaterial and the release means 50 in the form of a single strip occupying a housing formed along a generator line of the rotor element are equally possible. FIG. 4 shows a cylinder of the half-cylinder type in which the release means 50 and the electronic circuit 40 are both disposed on the same side, preferably in the upstream side further from the outside face of the door 10.

Figure 7:
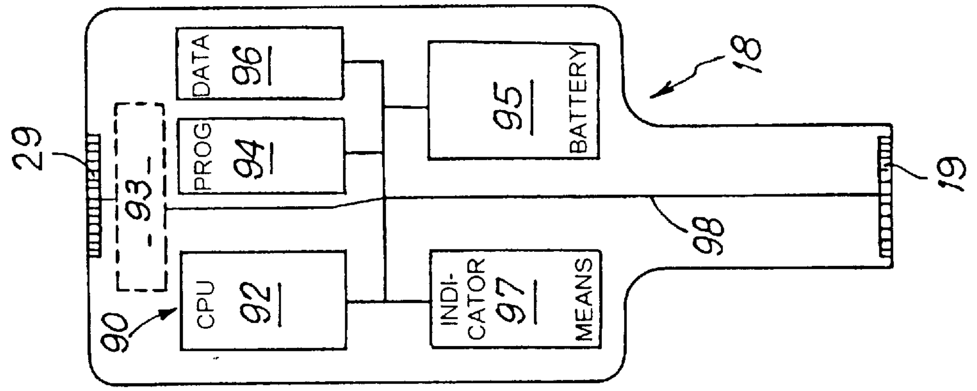
FIG. 7 is a block diagram of the internal components of the key of FIG. 1.

A first embodiment of the electronic key 18 is now described in detail with reference to FIGS. 5 to 7. This key is mainly constituted by two portions 18A and 18B, and at one end it includes a flat rod provided with the first electrical connection means 19 that is constituted by a set of individual contacts (comprising, for example, a ground contact and a single data contact) designed to co-operated with corresponding contacts of the second electrical connection means 39 present in the keyway 16 of the lock, and at its opposite end the key has a head of arbitrary shape that may advantageously be parallelepipedal, and that includes both a display 86 and a keypad 80 provided with a set of function keys 82 and digit keys 84 all of which are protected by a closable flap that protects the display and the keypad except while programing is being performed. Advantageously, additional connection means 29 may be provided to connect the key to an external programming module. Although the contacts in the example shown are disposed at the free end of the rod of the key 18, it is clear that the person skilled in the art could envisage any other configuration, such as a disposition on the side or on the back of the rod (see for example above-mentioned application EP 0 388 997). In the extreme, particularly when the cylinder has the energy supplying means 62 disposed internally for powering the microactuator 60 and when said means are also adequate for powering all of the electronic circuits, the electrical connection means 19; 39, 49 may be constituted merely by cordless data link means of the radio type or of the optical type (e.g. infrared). FIG. 7 is highly diagrammatic and shows the various electronic components making up the key. Like the electronic circuit 40 of the cylinder 14, the key 18 comprises firstly electronic means 90 comprising a central processor unit 92 or any other equivalent module, a program memory 94 and a data memory 96 interconnected by a common bus 98, and secondly a module 95 for powering these various electronic components, e.g. a rechargeable battery or a discardable battery, together with audible or visible indicator means 97. The power supply module also constitutes a source of energy for the electronic circuits of the lock which it powers via the first and second electrical connection means 19, 39.

The program memory 94 which is constituted by a read-only memory (a memory of the ROM type) or any analogous circuit is designed to record the programs required for performing various functions useful in controlling the central units 92 and 42 so as to ensure operation and programming of the lock in complete security (it may be observed that the central unit of the cylinder may also be controlled by its own program memory 44).

The data memory 96 which is constituted by a non-volatile but reinscriptible memory such as an electrically erasable and programmable read-only memory (EEPROM) is designed to record various types of data and in particular the various identification codes of the locks that are accessible to a given key.

When the key 18 includes complementary connection means 29, said means are connected directly to the common bus 98 or, when a cordless link is used with the external programming module, they are connected thereto via a specific interface 93, e.g. an optical or radio receiver (for an infrared or a radio link). Under such circumstances, the audible or visible indicator means 97 may act to indicate that programming has been successful. In order to simplify the structure of the key, when a particular interface is not necessary, it is possible to use the first electrical connection means 19 also as means for connection to the external programming means in order to enable the data memory 96 of the key to be programmed remotely. Naturally, if the link via the electrical connection means is no more than a single cordless link, then special interfaces must be provided in the key and also in the cylinder (like the interfaces shown in FIG. 8A for the cordless link between the two portions of the key).

Figure 8:
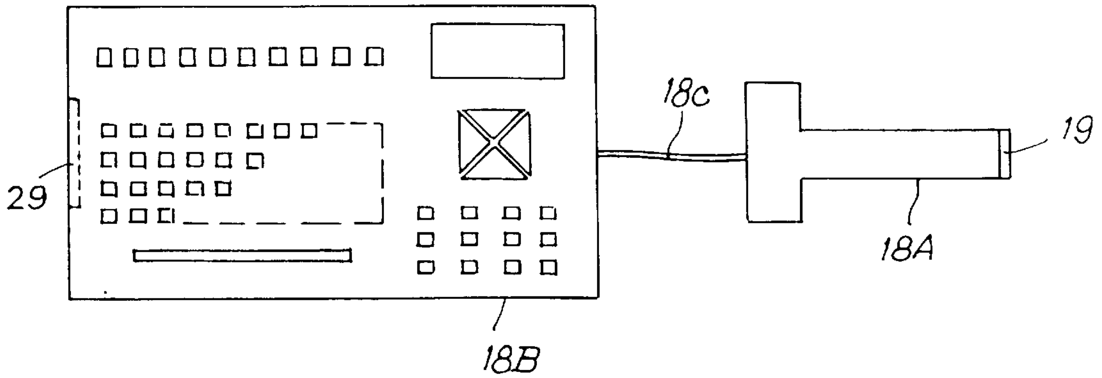
FIGS. 8, 8A and 9 show two embodiments of the key.
Figure 8A:
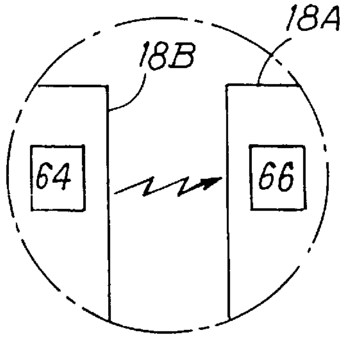
Figure 9:
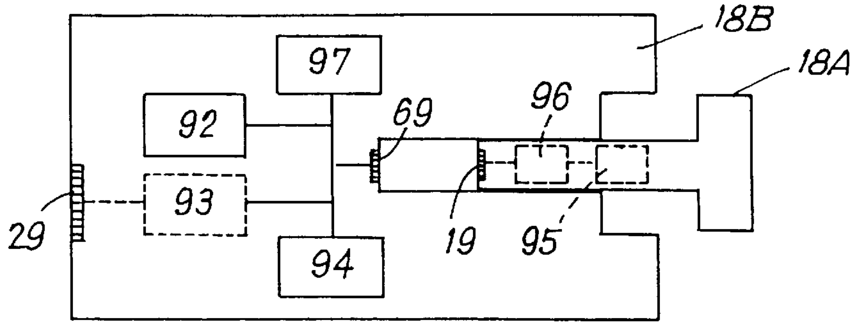
Figure 10:
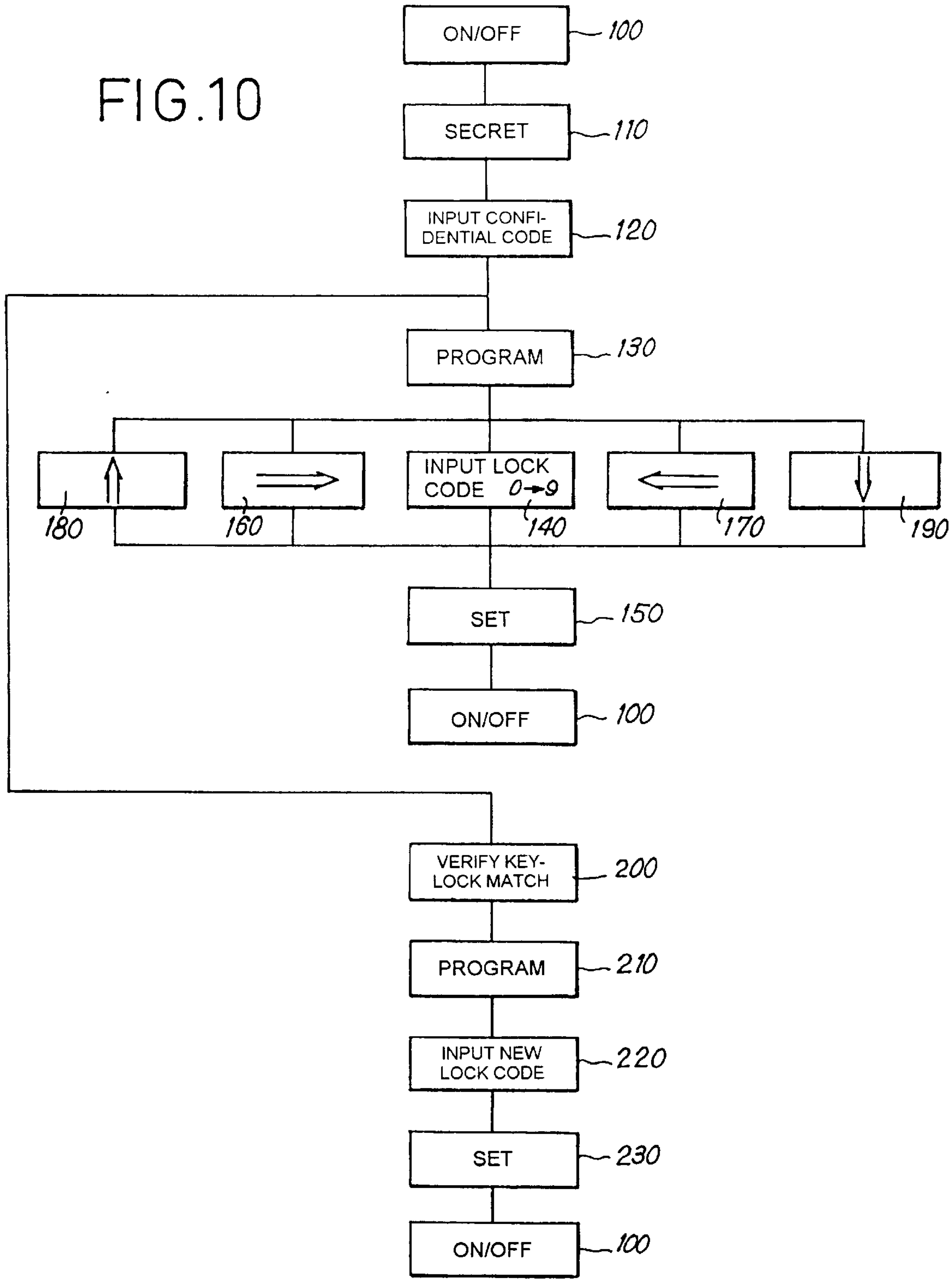
FIG. 10 is a flow chart showing the programming logic of the lock.

FIGS. 8 and 9 show two other embodiments of the key 18. In FIG. 8, the first and second portions 18A and 18B are separate and interconnected by a flexible cable 18C. As in the preceding embodiment, the first portion 18A is constituted by a single blade (then terminated by a grasping and operating handle) provided with the first electrical connection means 19. In contrast, the second portion 18B is now in the form of a multifunction electronic system, such as a calculator or an electronic notepad, integrating at least the electronic circuits 90 and the power supply module 95, and also the additional connector 92 (including its interface) if necessary. The cylinder is powered and data is transferred to the electronic circuits in the cylinder via the cable 18C that contains the common bus 90. It will easily be understood that this particular configuration presents the advantage of making available in the invention the multiple functions presently available only in a calculator, in a notepad, or in an electronic watch, which functions may include, for example: a calendar; a list of telephone numbers; a telephone dialer; a radio pager receiver; a unit for measuring various physical characteristics such as temperature or pressure; or indeed a device for controlling an alarm of a car or of a dwelling. Nevertheless, it should be observed that implementing some of these functions is not incompatible with the first embodiment of the key insofar as they are capable of being miniaturized (but access to the functions is then not easy). In addition, it should be observed that a cordless link, in particular an infrared link, could also validly be considered for making the link between the two portions of the key (see for example FIG. 8A in which there are also shown the interfaces 64 and 68 for the link with the common bus 90).

FIG. 8 shows a variant of the second embodiment of the above-described key in which the first and second portions 18A and 18B can be totally dissociated, the first portion constituting an element extractable from the second portion and electrically connectable thereto via the first electrical connection means 19 which cooperate with equivalent means 69 in the second portion. In this configuration, it is important for at least the battery 95 and the data memory 96 to be disposed in the extractable first portion 18A of the key (with this memory being readable directly under the control of the central unit 42 of the lock when the key is inserted in the cylinder), the other electronic elements of the key being capable of being present solely in the second portion 18B thereof.

An example of the operation of the high security lock of the invention and the programming thereof (FIG. 9) is described below.

In order to guarantee maximum security of the above-described programmable electronic system, the system may advantageously have two levels of security implemented by using two types of identification code. A code A for normal use and a code B for high security use. Thus, for example, for use within a business, it is possible to implement such a distinction to allow access to certain premises only to properly authorized persons who are then in possession of keys that are provided with both identification codes. Naturally, the system can be improved by including additional restrictions, in particular concerning times of day. It is also possible to provide the lock with a plurality of codes depending on circumstances of use, thereby enabling users to be put in a hierarchy, particularly in the context of industrial premises.

On this basis, operation of the system can be particularly simple. It is identical in both of the above-mentioned modes. Each lock has a single identification code (A or A+B) whereas, in contrast, a key can have a plurality of distinct identification codes (of the type A or A+B). When a key is inserted in the lock, an electrical link is established between the two elements, and the first identification code of the key is transferred to the electronic circuit in the lock, which code is then compared with the identification code specific to the lock. If the codes match, the electronic circuit of the lock then controls the release means which, once operated, allow the rotor elements of the cylinder to be rotated by the key, thereby allowing the door to be opened. Otherwise, in the absence of a match, the release means cannot be actuated so the door remains closed. Naturally, if the key includes a plurality of identification codes, the process described above is repeated for the other codes. In normal use mode, whatever the type of code recorded in the key (A or A+B) if the lock possesses codes A and B, a comparison is performed on code A only. In contrast, in high security mode, the comparison is performed on both codes A and B, and opening can be enabled only in the event of a complete match of the codes (but an A+B key can open a lock that possesses a single code A).

In order to increase the security of communications between the lock and the key, the above-described process may be made secure in various ways, particularly and conventionally by special encoding using a cipher key (and a specific algorithm). A security feature that is relatively simple to implement may consist in subdividing each code into two n-bit words (e.g. twice 8 bits). In a first step, the key sends only the first portion of its identification code to the lock (i.e. the first n-bit word), and the lock then compares this first code portion with the first portion of its own identification code. If a match is detected, then the electronic circuit of the lock sends the second portion of the lock code to the key which in turn can compare said second code portion with the second portion in its own memory. If a match is again obtained, then the lock can operate as described above.

Another simple method of providing security for data communications between the key and the lock is to provide a memory space in the lock data memory 46 which is accessible in reading only and which contains solely a reference number of the lock. Thus, after the key has been inserted, its controlling central unit 92 reads the contents of said memory space via the electrical connection means 19 (or any equivalent link means) and then sends the lock only the corresponding identification code which can then, as before, be compared in the lock with its own identification code. This procedure serves to avoid transmitting all of the identification codes to the lock, thereby preventing possible interception of all of this sensitive information.

In accordance with an essential aspect of the invention, the identification codes of the lock and of the key can be changed by the user directly from the key. No external computer apparatus (e.g. a personal computer) is required to perform this action, and the user has no need to turn to the manufacturer, even in the event of a key being lost. Nevertheless, if a key has been lost, the user must have taken care to have noted down and recorded the personal code(s) required for reprogramming the new key.

Codes in the key 18 (e.g. after losing an earlier key) are programmed from the keypad 80 with programming being monitored by the display 86. In a first step 100, the user actuates an ON/OFF first function key (O) to gain access to the various high level functions of the key (and in particular programming). Acting on a SECRET second function key (I) in a following step 110 serves to validate the input of a confidential code (on m bits, e.g. 5 bits) which is performed by means of the digit keys 84 in step 120, and to display a first memory location of the key on the display 86, in particular for optionally authorizing a subsequent change of the data present at said location. Such write access is possible only after acting during step 130 on a PROGRAM (P) third function key, and it is performed during a new step 140 by inputting a first lock code likewise by means of the digit keys, with said code being validated during a final step 150 by means of a SET fourth function key (V). Previously, displacement function keys (←→) or an erase function key (C) may have been used, where necessary, to alter the code in the event of wrong input (steps 160 and 170). The following codes (for a plurality of locks or for several code levels, e.g. A and B) can then be input during subsequent steps 180 and 190 by making use in similar manner of other displacement function keys (↓↑). When these steps are over, the key is programmed and it is ready to operate, and the ON/OFF first function key can again be actuated to terminate the process of programming the key. The above-described manual programming process may be applied equally well during initial programming and during subsequent changes of one or more codes, and when adding new codes. Naturally, automatic programming can also be envisaged and is indeed preferable when greater security is required (in particular for dwellings). This may be performed after inputting the confidential code and on the basis of an internal algorithm present in the read-only memory 94. It may be necessary in this case to input another personal code in order to enable the various identification codes to be generated.

In order to program codes in various different locks, it is necessary to insert the key into each lock whose identification code is to be changed. The user initially actuates the ON/OFF and the SECRET function keys in succession, then enters the confidential code, and then inserts the key in the lock (at this point it is possible, where necessary, to look for the memory location corresponding to the code of the lock that is to be changed by using the displacement keys, as mentioned above). The electronic circuit of the key and/or the electronic circuit of the lock then operate(s) in a step 200 to verify that the lock and the key identification codes match, and in a following step to validate action on the PROGRAM third function key which enables a new identification code to be input (step 220), which code is transmitted to the lock for recording in its data memory after action on the SET fourth function key in a step 230. The key can then be withdrawn from the lock and the ON/OFF key can be actuated for a last time.

Additional function keys are also provided for programming the lock in normal mode (comparison with a single code A) and in high security mode (comparison with codes A and B). These two keys: NORMAL (N) and SECURE (S); are activated only for a user having a key that already includes identification codes provided with A codes and with B codes. In addition, after acting on one or other of these two keys, the audible or visible indicator means 97 emit one or two audible or visible signals, depending on which mode has been selected, for the purpose of informing the user which mode is in progress. These signals may also be emitted when the key is inserted in order to validate the connection. A RESTRICTION key (R) may also be provided to restrict use of the key to one or more locks. After gaining access to programming functions by pressing ON and SECRET and inputting the confidential code, pressing the R key followed by the desired lock numbers (or calling them up in an address book function) enables the corresponding cylinders to be validated. Thus, it is possible to use this procedure to lend a key to a third party for a specific access, without any risk of the third party using the same key to gain access to non-authorized locations. When combined with a clock or calendar function, this restriction function can enable access to be authorized solely under specified time conditions. Return to unlimited access is achieved by acting on the R key again and then on the erase key C. This function key may also be used with an additional key, e.g. a digit key O, to prevent any use of the key. The resulting deactivation function which may be temporary only or which may be achieved automatically after a determined lapse of time is particularly useful when the user has several copies of the same key and some of them remain unused (the unused keys can then be deactivated so that they are unusable if they are lost or stolen). It should be observed that for complete security, this function may advantageously be activated between two instances of use.

The programmable closure system of the invention is thus well adapted for replacing present-day mechanical systems, but with greater security and flexibility of use while nevertheless providing numerous new functions that are particularly advantageous. Other improvements can also be envisaged, in particular for the purpose of reducing battery consumption of the key or for further increasing security.

Thus, battery lifetime can be considerably increased, as mentioned above, by dissociating the powering of the electronic circuits, as performed by the battery, from the power requirements necessary for releasing the bolt (controlling the micro-actuator 60). At least three known solutions are presently appropriate for establishing the electrical current required for this purpose when the key is inserted or rotated. Firstly the current may be generated by magnetic induction, e.g. due to a magnet being displaced under the effect of the key being inserted into a surrounding coil (it may be preferable to store the current induced by the variation in magnetic flux rather than using it at once). Secondly the current may be produced by a miniature generator driven by rotation of the key and coupled to an appropriate gear system. Finally, it is also possible to envisage using piezo-electrical generators. Such systems rely on a mechanical device which, when driven by insertion or rotation of the key, exerts a force on a piezo-electric crystal (directly or via a resilient element constrained by the device) and in return it generates charge that creates the electrical current.

Similarly, security of the system can be increased by protecting the cylinder and the key in conventional manner against electromagnetic emission by radiation or by preventing non-authorized access (in particular by scanning through a set of codes in succession), e.g. by requiring the user to withdraw the key after each unsuccessful attempt or by imposing a minimum waiting time before any new attempt.

What is claimed is:

1. A user programmable electronic closure system comprising:

a lock to be operated by a user with a key when an identification code of the lock and an identification code of the associated key are observed to match;

the lock including a cylinder provided with a portion in which at least one keyway is provided for receiving said key;

the cylinder including at least one electrical connection means, electronic control means including at least one reinscriptible memory means for storing at least one of a plurality of identification codes and connected to the at least one electrical connection means, and release means responsive to said electronic control means and designed to release the lock;

the key including first electrical connection means for cooperating with a second one of the at least one electrical connection means of the lock when the key is inserted in the corresponding keyway, first electronic control means including first reinscriptible memory means for storing at least one of a plurality of identification codes and connected to the first electrical connection means, and inputting means for a user to input a confidential code;

the electronic control means of the key and of the lock, and the cylinder release means being powdered by power supply means; and the key including user programming means for the user to modify the data contained in each of the electronic control means of the key and of the lock under the control of the inputting means and without need of a manufacturer of the system and using the inputting means of the key.

2. A programmable electronic system according to claim 1, wherein said first and second electrical connection means comprise first and second cordless link means.

3. A programmable electronic system according to claim 1, wherein said power supply means comprises a rechargeable battery or a discardable battery disposed in the key.

4. A programmable electronic system according to claim 1, wherein said power supply means further comprises electricity generator means disposed in the cylinder of the lock and actuated by insertion or rotation of the key, serving to power at least the release means.

5. A programmable electronic system according to claim 1, wherein said key is formed of distinct first and second portions interconnected by an intermediate portion.

6. A programmable electronic system according to claim 1, wherein said intermediate portion is constituted by a flexible electrical link.

7. A programmable electronic system according to claim 5, wherein said intermediate portion is constituted by a cordless link.

8. A programmable electronic system according to claim 5, wherein said first portion is in the form of a rod provided with a handling head and including the first electrical connection means and in that said second portion is capable of acting as an electronic multifunction unit and further includes the electronic means and the power supply of the key and the programming means.

9. A programmable electronic system according to claim 1, wherein said key is constituted by a separable connection of a first portion in the form of a rod provided with a handling head and including the first electrical connection means and at least the power supply means and the first reinscriptible memory means, and a detachable section portion capable of acting as a multifunction electronic unit and including all of the means required for programming the data contained in the electronic means of the key and of the lock and connected with a third electrical connection means adapted for receiving the first electrical connection means when the key is not inserted in the lock.

10. A programmable electronic system according to claim 8, wherein said electronic multifunction unit comprises one of the following devices: an electronic calculator, an electronic notebook, an electronic watch, a radio paging receiver, a telephone dialer, an alarm and a measurement sensor.

11. A programmable electronic system according to claim 1, wherein said key further includes additional connection means for remotely programming data contained in the electronic control means of said key and of the lock.

12. A programmable electronic system according to claim 11, wherein said additional connection means includes cordless connection means.

13. A programmable electronic system according to claim 11, wherein said first electrical connection means is also used as external connection means.

14. A programmable electronic system according to claim 1, wherein said key further includes mechanical coding means for cooperating with corresponding mechanical decoding means of the lock.

15. A programmable electronic system according to claim 1, wherein the electronic control means of the lock further includes comparator means for comparing the identification code of the lock and at least one corresponding code of the key received via the electrical connection means.

16. A programmable electronic system according to claim 1, wherein the electronic control means of the key further includes comparator means for comparing the identification code of the lock and at least one corresponding code of the key received via the electrical connection means.

17. A programmable electronic system according to claim 15, wherein the identification codes are transmitted between the lock and the key by means of encoding using a cipher key.

18. A programmable electronic system according to claim 1, wherein said reinscriptible memory means of the cylinder includes a memory space that is accessible to the key for reading only.

19. A programmable electronic system according to claim 1, wherein each identification code includes a first and second identification code, and in that, in a normal mode, only the respective first identification code of the lock and of the key are compared, whereas in a secure mode, comparison is performed on both the first and on the second identification codes.

20. A programmable electronic system according to claim 19, wherein each identification code is made up of two n-bit words.

21. A programmable electronic system according to claim 19, wherein the electronic control means of the cylinder of the lock initially operates via the comparator means disposed in the cylinder to compare the first n-bit word of the identification code of the lock with the first n-bit word of the identification code of the key as received form the key via the electrical connection means, and in that the first electronic control means of the key likewise includes comparator means for operating, in a second stage, and in the event of a match between said two first words, to compare the second n-bit word of the identification code of the key with the second n-bit word of the identification code of the lock as received from the lock via the electrical connection means, a new match relating to the two second words being required to authorize release of the lock.

22. A key for use by a user for cooperating with a cylinder of a lock including at least one electrical connection means, electronic control means including at least one memory means for storing at least one identification code and connected to the at least one electrical connection means, and release means responsive to said electronic control means and designed to release the lock, said key comprising a first electrical connection means for cooperating with the electrical connection means of the cylinder of the lock when the key is inserted in a keyway of the cylinder, and first electronic control means including at least first reinscriptible memory means for storing at least one of a plurality of identification codes and connected to the first electrical connection means, characterized in that said key further comprises programmable means for the user to modify the data contained in each of the electronic control means of the key and of the cylinder of the lock under the control of means for inputting a confidential code and without input from a manufacturer of the key, the inputting means being in the key.

23. A key for use by a user for cooperating with a cylinder of a lock including at least one cordless link means, electronic control means including at least one memory means for storing at least one identification code and connected to the at least one cordless link means, and release means responsive to said electronic control means and designed to release the lock, said key comprising a first cordless link means for cooperating with the cordless link means of the cylinder of the lock when the key is inserted in a keyway of the cylinder and first electronic control means including at least first reinscriptible memory means for storing at least one of a plurality of identification codes and connected to the first cordless link means, characterized in that said key further comprises programming means for the user to modify the data contained in each of the electronic control means of the key and of the cylinder of the lock under the control of means for inputting a confidential code without input from a manufacturer of the key, the inputting means being in the key.

24. A key according to claim 22, wherein the key further comprises power supply means for powering said electronic control means of the key and of the cylinder of the lock, said power supply means comprising advantageously rechargeable battery or a discardable battery.

25. A key according to claim 22, including audible or visible indicator means for informing the user whether the key is operating in normal mode or in secure mode.

26. A key according to claim 22, wherein said programming means includes a special secure function key making it possible only for the users of keys capable of operating in secure mode to change the identification codes of locks.

27. A key according to claim 22, wherein said programming means includes a special restriction function key enabling the holder of a key to validate access to one or more determined locks from a set of locks operable by the key.

28. A key according to claim 22, wherein said programming means includes a determined combination of specific function keys for enabling the holder of a key to prevent use thereof by activating its essential functions of reading and of comparison.

29. A key according to claim 28, wherein said prevention can be temporary or can be performed automatically after a determined operating time.

30. A cylinder of a lock for cooperating with a key according to claim 22, comprising one electrical connection means, electronic control means including at least one reinscriptible memory means for storing at least one of a plurality of identification codes and connected to the at least one electrical connection means, and release means responsive to said electronic control means and designed to release the lock, said cylinder being characterized in that the data contained in the electronic control means can be modified by the user only by programming means of the key and without input from a manufacturer of the cylinder.

31. A self-programmable electronic closure system, comprising:

a lock having a first memory for storing an identification code of the lock; and a key having a second memory for storing an identification code of the key, said key being operable to unlock said lock when said identification code of said key matches said identification code of said lock, wherein said key includes a user input for allowing a user to modify said identification codes.

32. A self-programmable electronic closure system, comprising:

a lock having a first memory for storing an identification code of the lock; and a key having a second memory for storing a plurality of identification codes of the key, each corresponding to a different lock, said key being operable to unlock said lock when one of said identification codes of the key matches said identification code of the lock, wherein said key includes a user input for allowing a user to modify said identification codes.

* * * * *